United States Patent
Seemann et al.

(10) Patent No.: US 12,009,660 B1
(45) Date of Patent: Jun. 11, 2024

(54) PREDICTING SPACE, POWER, AND COOLING CAPACITY OF A FACILITY TO OPTIMIZE ENERGY USAGE

(71) Applicant: T-Mobile USA, Inc., Bellevue, WA (US)

(72) Inventors: Sean Seemann, Seattle, WA (US); John Coster, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/350,623

(22) Filed: Jul. 11, 2023

(51) Int. Cl.
*H02J 3/00* (2006.01)

(52) U.S. Cl.
CPC ............ *H02J 3/004* (2020.01); *H02J 2203/20* (2020.01)

(58) Field of Classification Search
CPC ............................................ G05B 2219/34477
See application file for complete search history.

(56) References Cited

U.S. PATENT DOCUMENTS

| | | | |
|---|---|---|---|
| 6,876,988 | B2 | 4/2005 | Helsper et al. |
| 7,369,981 | B1 | 5/2008 | Saghier et al. |
| 7,881,961 | B2 | 2/2011 | Ricketts |
| 7,890,473 | B1 | 2/2011 | Wyett et al. |
| 8,041,808 | B1 | 10/2011 | Becker |
| 8,056,082 | B2 | 11/2011 | Koretz et al. |
| 8,122,185 | B2 | 2/2012 | Merry et al. |
| 8,307,224 | B2 | 11/2012 | Conroy et al. |
| 8,311,681 | B1 | 11/2012 | Marcus |
| 8,560,687 | B1 | 10/2013 | Becker |
| 8,935,019 | B2 | 1/2015 | Swanson et al. |
| 8,966,080 | B2 | 2/2015 | Akidau et al. |
| 9,104,971 | B1 | 8/2015 | Chamness et al. |
| 9,108,646 | B2 | 8/2015 | Swanson et al. |
| 9,156,359 | B2 | 10/2015 | Atluri et al. |
| 9,294,558 | B1 | 3/2016 | Vincent et al. |
| 9,454,143 | B2 | 9/2016 | Raymond |
| 9,646,256 | B2 | 5/2017 | Chamness et al. |
| 9,651,973 | B2 | 5/2017 | Forbes |
| 9,652,297 | B2 | 5/2017 | You et al. |
| 9,697,488 | B1 | 7/2017 | Shaikh et al. |
| 9,710,165 | B1 | 7/2017 | Lherault et al. |

(Continued)

FOREIGN PATENT DOCUMENTS

| | | |
|---|---|---|
| CN | 106055435 B | 8/2019 |
| CN | 111831469 A | 10/2020 |

(Continued)

*Primary Examiner* — Nathan L Laughlin
(74) *Attorney, Agent, or Firm* — Perkins Coie LLP

(57) ABSTRACT

Described herein is a capacity system that predicts capacity needs of a system. The capacity system captures outputs from meters coupled to subsystems within the system, where the outputs are not expressed in standard power units. For each subsystem, the capacity system determines values for a set of conversion factors related to the subsystem. The conversion factors describe the design and operation of the subsystem. The capacity system converts the outputs to standard power units based on the set of conversion factors and simulates behavior of the subsystems based on trends shown by the converted outputs. The capacity system forecasts an expected capacity of the system over a time period and uses the forecast to predict a date during the time period when the subsystem will experience a reduction in capacity.

20 Claims, 10 Drawing Sheets

(56) References Cited

U.S. PATENT DOCUMENTS

| | | |
|---|---|---|
| 9,939,790 B1 | 4/2018 | Churnock et al. |
| 9,965,220 B2 | 5/2018 | Alavoine et al. |
| 10,001,518 B2 | 6/2018 | Cheim et al. |
| 10,108,460 B2 | 10/2018 | Gopisetty et al. |
| 10,184,320 B2 | 1/2019 | Al-turki et al. |
| 10,410,440 B2 | 9/2019 | Remboski et al. |
| 10,417,614 B2 | 9/2019 | Johnson et al. |
| 10,532,000 B1 | 1/2020 | De Sapio et al. |
| 10,599,204 B1 | 3/2020 | Ross et al. |
| 10,613,962 B1 | 4/2020 | Delange |
| 10,761,774 B2 | 9/2020 | Alavoine et al. |
| 10,783,288 B1 | 9/2020 | Timar et al. |
| 10,809,921 B1 | 10/2020 | Lherault et al. |
| 10,819,599 B2 | 10/2020 | Mahindru et al. |
| 10,915,361 B1 | 2/2021 | Lin et al. |
| 10,926,888 B2 | 2/2021 | Martin et al. |
| 10,937,114 B2 | 3/2021 | Franklin et al. |
| 11,037,081 B1 | 6/2021 | Adnan et al. |
| 11,055,356 B2 | 7/2021 | Ritchey et al. |
| 11,635,798 B2 | 4/2023 | Wanner |
| 2007/0050646 A1 | 3/2007 | Conroy et al. |
| 2013/0198112 A1 | 8/2013 | Bhat |
| 2013/0297089 A1 | 11/2013 | Fu et al. |
| 2017/0323240 A1 | 11/2017 | Johnson et al. |
| 2018/0052063 A1* | 2/2018 | Gennello ............ H05K 7/20836 |
| 2018/0225684 A1 | 8/2018 | Ray Majumder et al. |
| 2019/0041882 A1* | 2/2019 | Noboa ..................... F24F 11/62 |
| 2020/0050510 A1* | 2/2020 | Chien ................. G06F 11/1428 |
| 2021/0216849 A1 | 7/2021 | Poghosyan et al. |
| 2021/0381861 A1* | 12/2021 | Brown ................... G05D 27/02 |
| 2022/0171346 A1 | 6/2022 | Keating et al. |
| 2022/0244954 A1 | 8/2022 | Kim et al. |
| 2022/0332165 A1 | 10/2022 | Haskara et al. |
| 2023/0030820 A1 | 2/2023 | Wang et al. |
| 2023/0072534 A1 | 3/2023 | Jaberg et al. |
| 2023/0105859 A1 | 4/2023 | Leffler et al. |
| 2023/0213922 A1* | 7/2023 | Bharadwaj ............. G05B 13/04 703/13 |

FOREIGN PATENT DOCUMENTS

| | | |
|---|---|---|
| CN | 112053730 A | 12/2020 |
| CN | 112200376 A | 1/2021 |
| CN | 112348666 A | 2/2021 |
| CN | 112445720 A | 3/2021 |
| CN | 112602049 A | 4/2021 |
| CN | 108604114 B | 6/2021 |
| CN | 110392549 B | 2/2022 |
| CN | 113168294 B | 7/2022 |
| CN | 112736987 B | 1/2023 |
| DE | 112013007263 T5 | 4/2016 |
| DE | 112017000017 T5 | 5/2018 |
| DE | 212016000256 U1 | 8/2018 |
| DE | 102020131613 A1 | 9/2021 |
| DE | 102020132897 A1 | 12/2021 |
| EP | 1381953 A2 | 1/2004 |
| EP | 1836624 A2 | 9/2007 |
| EP | 2805397 A2 | 11/2014 |
| EP | 2951655 B1 | 3/2017 |
| EP | 3145749 A1 | 3/2017 |
| EP | 3149501 A1 | 4/2017 |
| EP | 3242266 A1 | 11/2017 |
| EP | 2500738 B1 | 7/2018 |
| EP | 3411775 B1 | 12/2019 |
| EP | 3608744 B1 | 10/2021 |
| JP | 2015502081 A | 1/2015 |
| JP | 6025785 B2 | 10/2016 |
| JP | 2018105848 A | 7/2018 |
| JP | 6416279 B2 | 10/2018 |
| JP | 6430391 B2 | 11/2018 |
| JP | 6513881 B2 | 4/2019 |
| JP | 7256092 B2 | 4/2023 |
| KR | 20140090243 A | 7/2014 |
| KR | 101728991 B1 | 4/2017 |
| KR | 20170117377 A | 10/2017 |
| KR | 101856402 B1 | 5/2018 |
| KR | 20210068135 A | 6/2021 |
| WO | 0126249 A1 | 4/2001 |
| WO | 0244901 A2 | 6/2002 |
| WO | 2007024396 A1 | 3/2007 |
| WO | 2007115317 A2 | 10/2007 |
| WO | 2012012723 A2 | 1/2012 |
| WO | 2013028840 A1 | 2/2013 |
| WO | 2013086411 A1 | 6/2013 |
| WO | 2013089782 A2 | 6/2013 |
| WO | 2013109890 A2 | 7/2013 |
| WO | 2014005523 A1 | 1/2014 |
| WO | 2014078838 A2 | 5/2014 |
| WO | 2015034954 A1 | 3/2015 |
| WO | 2015177218 A1 | 11/2015 |
| WO | 2015183336 A1 | 12/2015 |
| WO | 2015184184 A2 | 12/2015 |
| WO | 2016036809 A1 | 3/2016 |
| WO | 2016094145 A1 | 6/2016 |
| WO | 2016176064 A1 | 11/2016 |
| WO | 2017136099 A2 | 8/2017 |
| WO | 2017192998 A1 | 11/2017 |
| WO | 2018013077 A1 | 1/2018 |
| WO | 2020219078 A1 | 10/2020 |
| WO | 2021002930 A1 | 1/2021 |
| WO | 2021110894 A1 | 6/2021 |
| WO | 2023057362 A1 | 4/2023 |

* cited by examiner

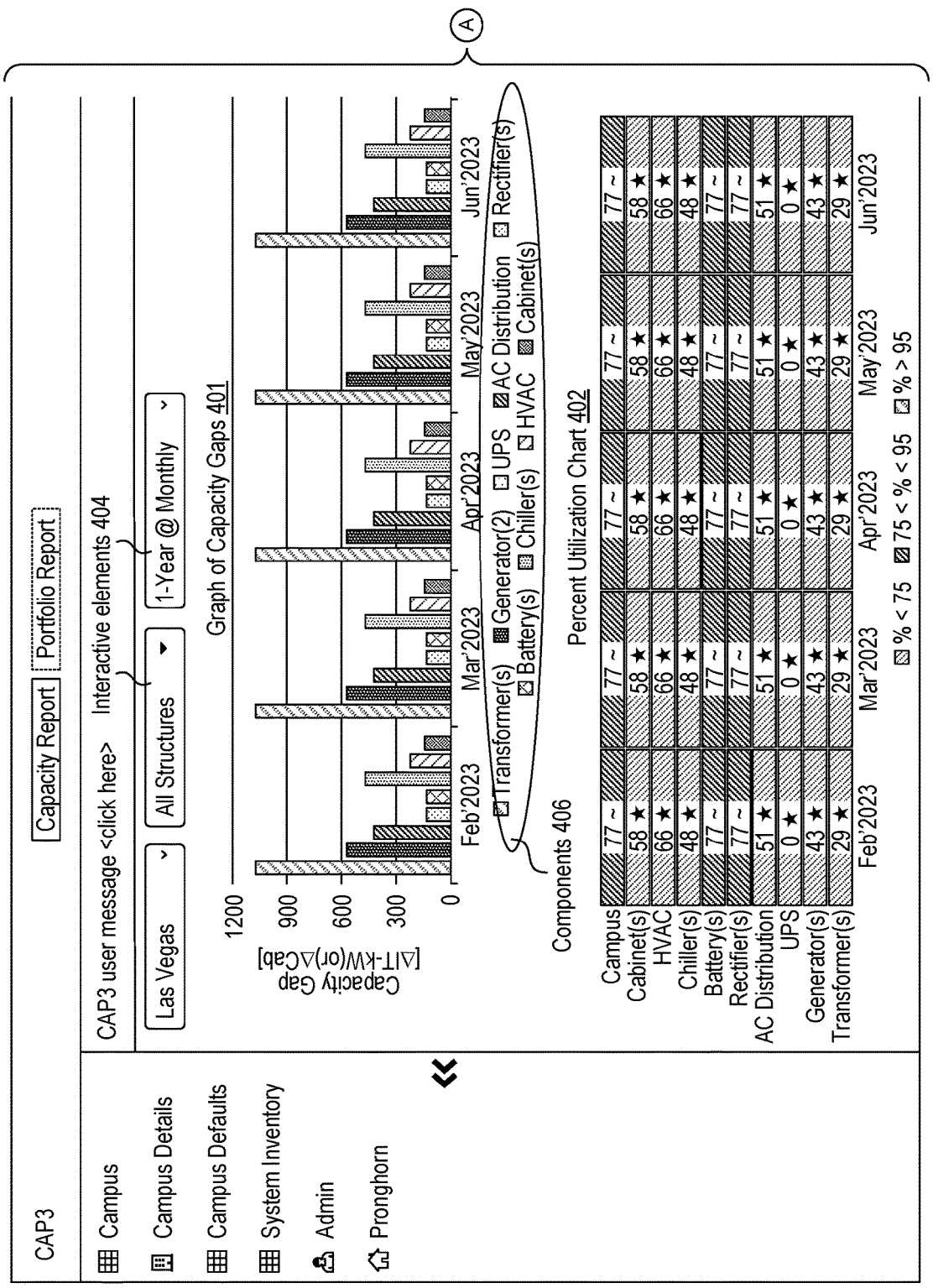
FIG. 4A(1)

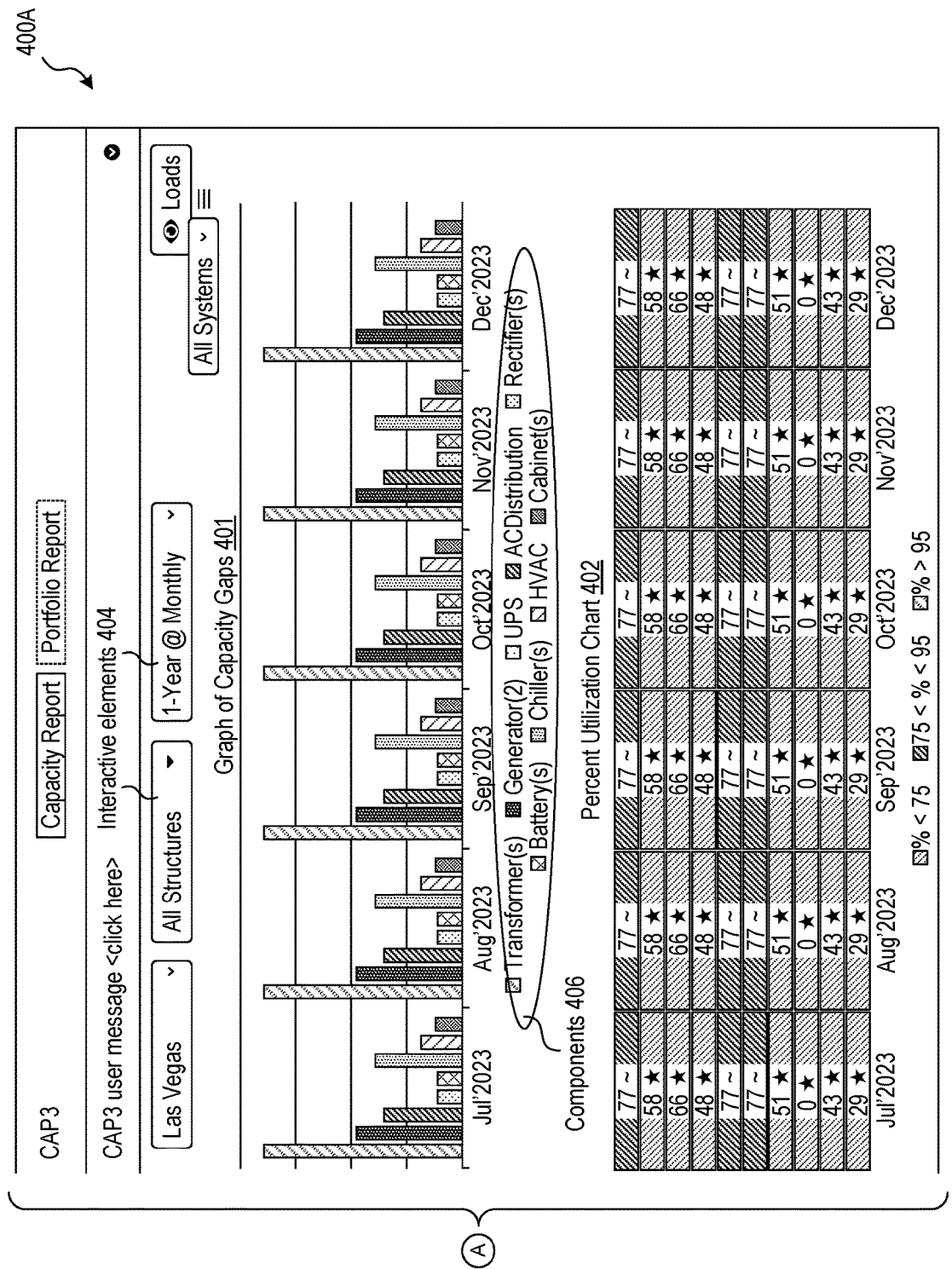
FIG. 4A(2)

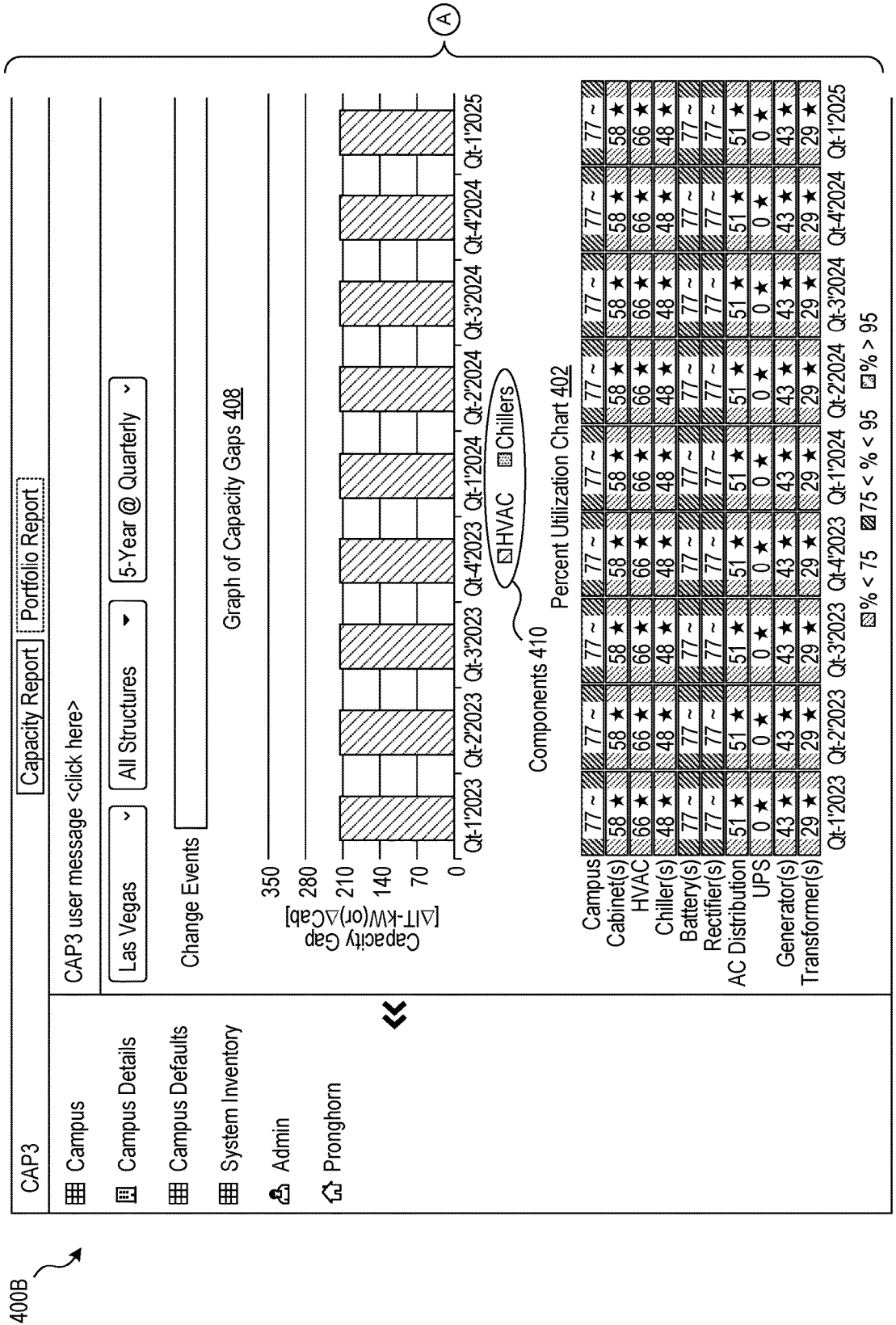
FIG. 4B(1)

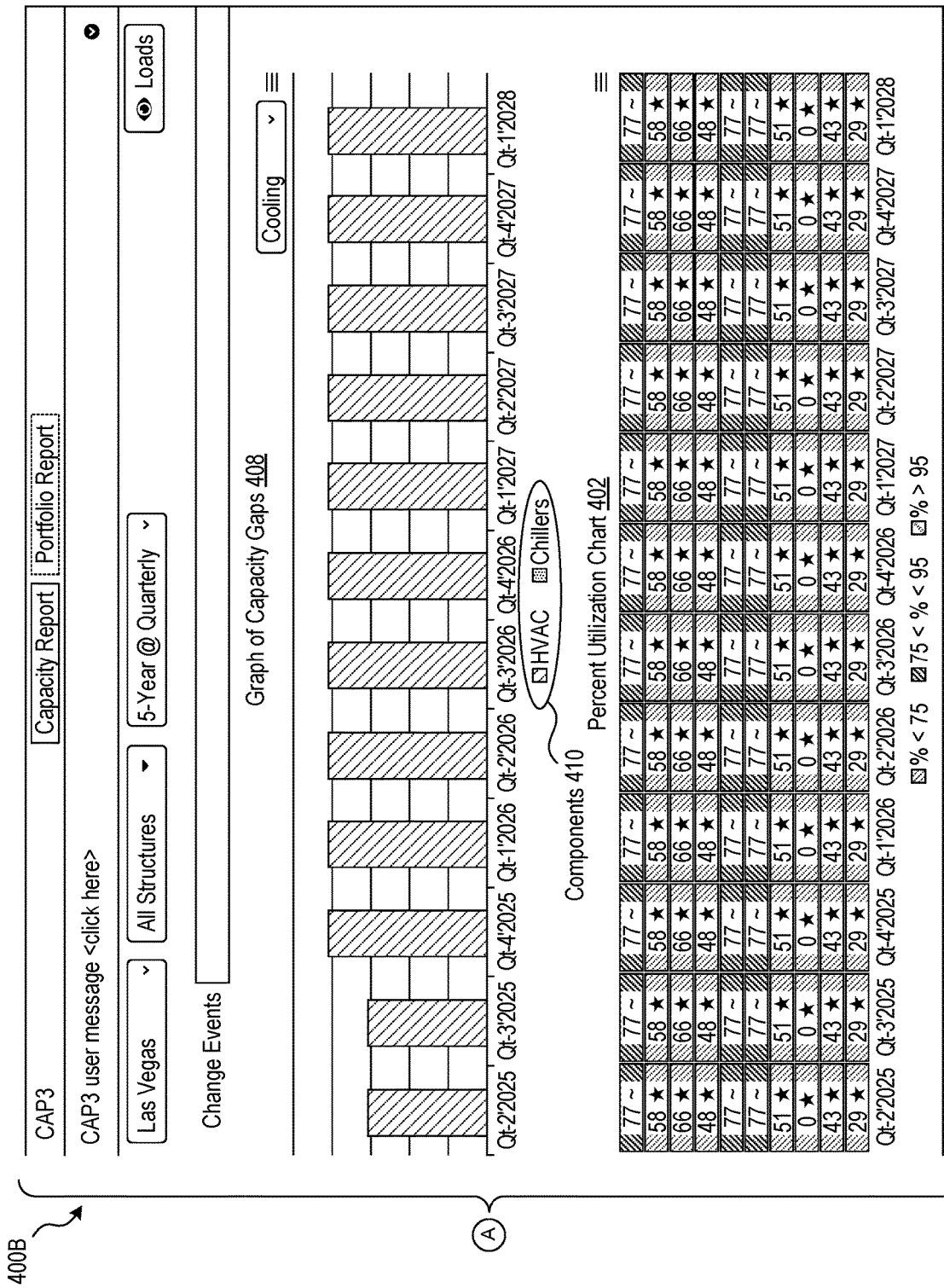
FIG. 4B(2)

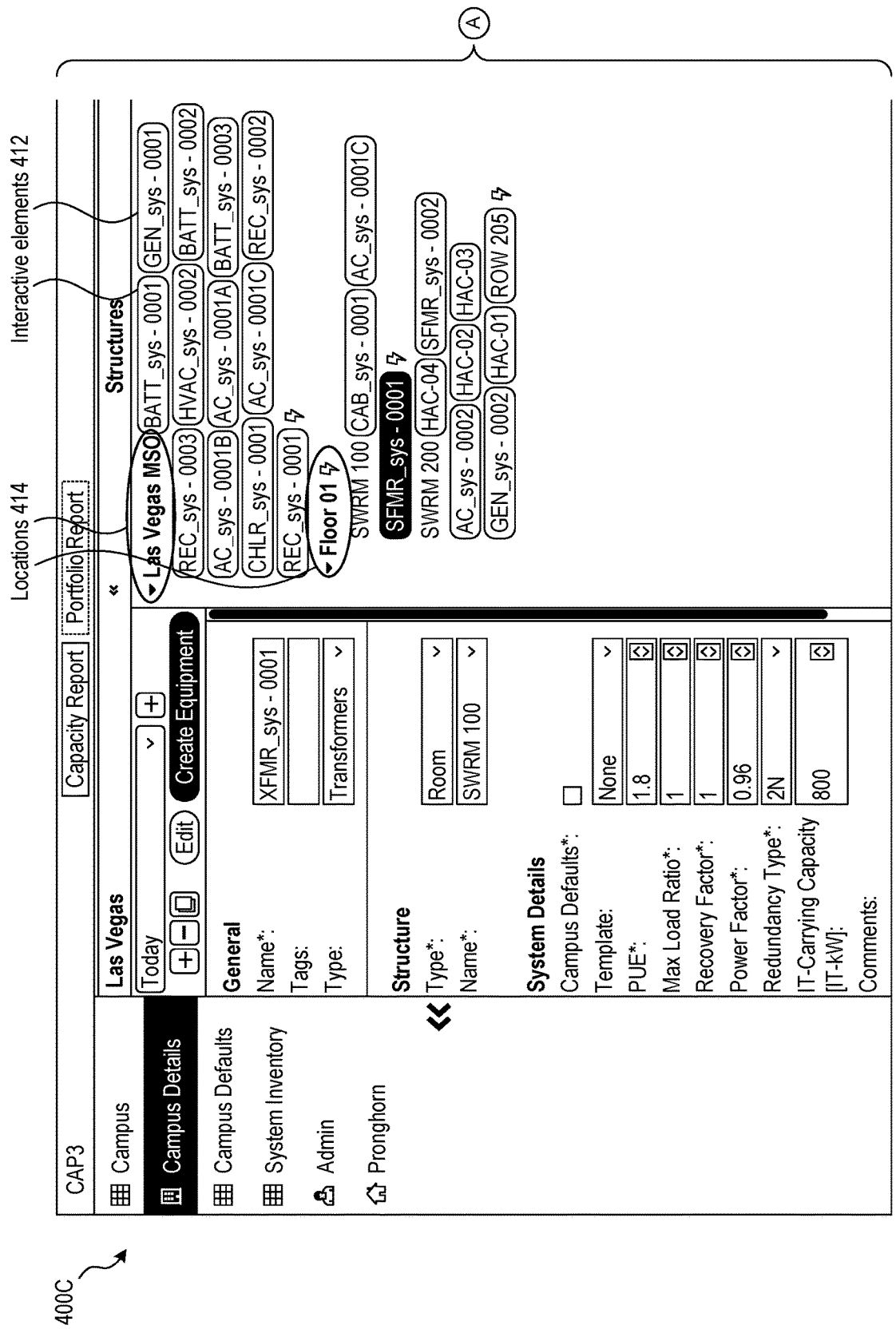
FIG. 4C(1)

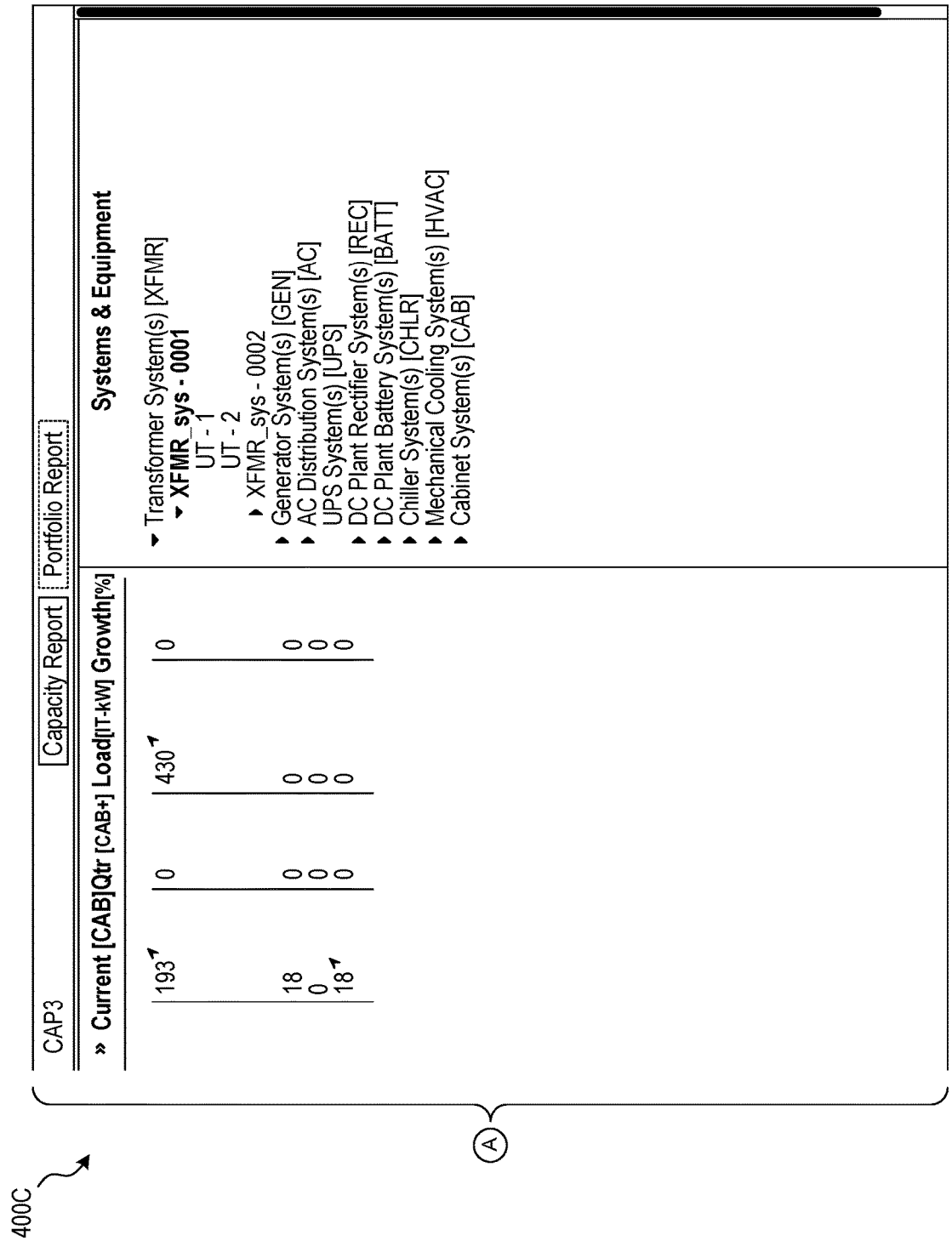
FIG. 4C(2)

PREDICTING SPACE, POWER, AND COOLING CAPACITY OF A FACILITY TO OPTIMIZE ENERGY USAGE

BACKGROUND

A system can include a variety of subsystems that function together to perform an overall function. The subsystems can include both power and cooling subsystems, which each take up space within a facility of the system. These space, cooling, and power needs of the subsystems cannot be easily assessed against one another given that they do not produce the same standardized output to representing capacity. Further, the system may function with other systems within a larger system, such as a telecommunications network, to support functionality of the larger system. These other systems are typically not standardized in design or operation, often due to the acquisition of the larger system through mergers and purchases. The other systems' operations and designs may also have been changed over time as the needs of the other system's owner(s) changed. Engineers may look to drawings of these systems to understand capacity needs, but, frequently, the drawings of the systems were not updated when these changes were made, negating the use of the drawings by engineers. Engineers need this information to determine what components need to be repaired, added, removed, and the like, not only to maintain the function of the system itself but also to maintain the function of the larger system. Thus, a cohesive framework for understanding capacity of a system, such as one within a facility, is needed.

Further, without understanding the capacity needs of a system, resources such as power and space may be wasted. Unnecessary energy consumption leads to excessive greenhouse gas emissions caused by production of electricity. Though the excess may be large for a single system, the combination of excess of systems throughout the globe, such as those used for telecommunications networks, is massive and could be reduced by increased capacity understandings for the systems.

BRIEF DESCRIPTION OF THE DRAWINGS

Detailed descriptions of implementations of the present invention will be described and explained through the use of the accompanying drawings.

FIG. 4A is an example of a graphical user interface (GUI) depicting capacity gaps across components in a system.

FIG. 4B is an example of a GUI depicting capacity gaps across subsystems in a system.

FIG. 4C is an example of a GUI depicting interactive elements representing components in a system.

Figure 1:
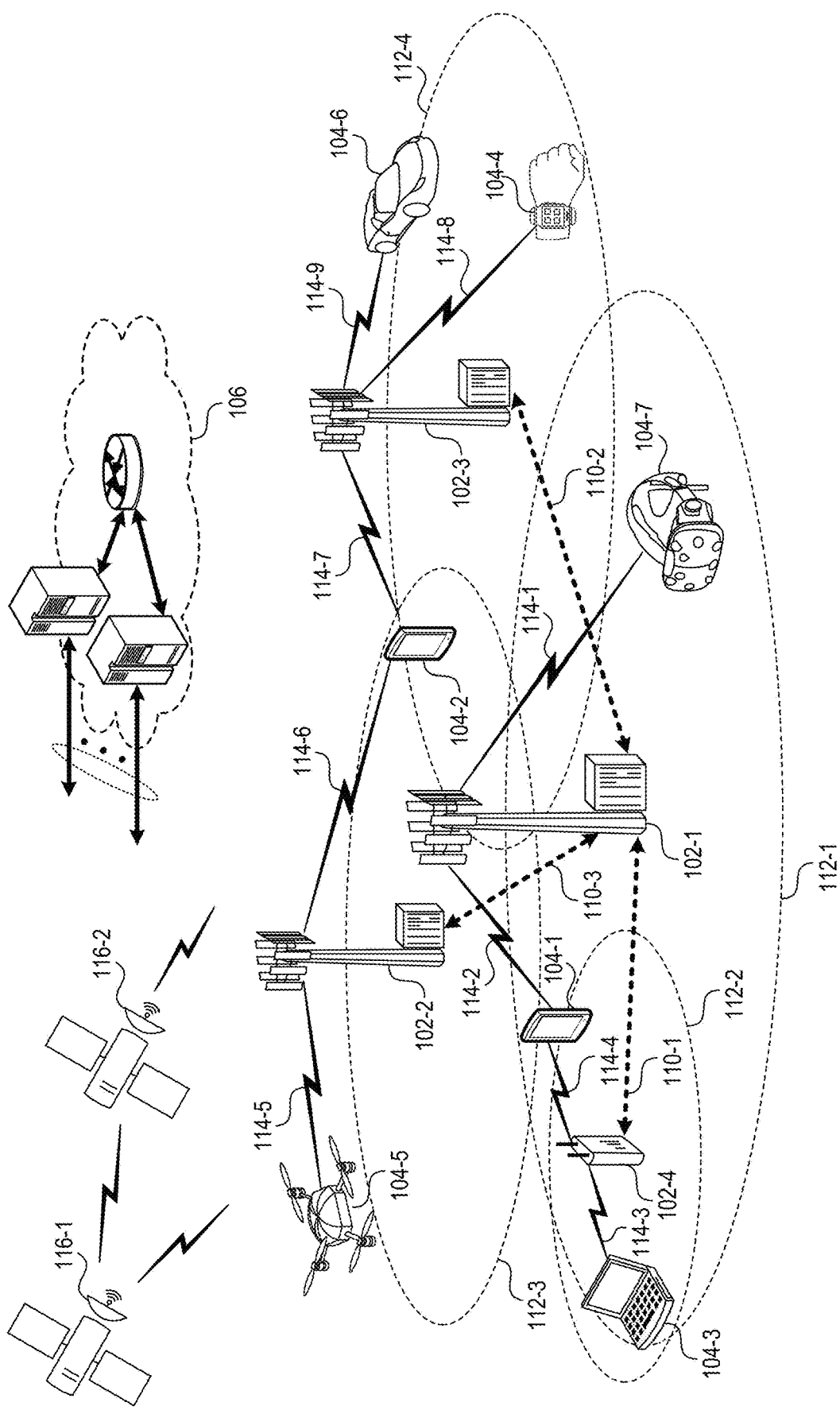
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed systems and methods enable a system to determine capacity of a system and predict future capacity of the system. Without being able to predict capacity needs of a system, the system may waste energy and space, leading to greenhouse gas production that could have been avoided. Further, the system could break down if operators are unaware that more capacity for power, space, or cooling within the system is necessary.

The system described herein creates a common framework for understanding capacity of a system and its subsystems. Though outputs of the subsystems and components they contain may be expressed in different units, the system can convert outputs from the subsystems into a standardized format. For example, the system can convert electrical outputs and data expressed in non-electrical outputs to standard units of power. If the outputs cannot be directly converted to power (such as for non-electrical outputs or physical space needs), the system can convert the outputs to a representation of the outputs in terms of standard units of power. The system can use the converted outputs to determine a capacity of each of the subsystems and the system and predict capacity of the subsystems and system in the future based on current capacity trends. Based on these predictions, the system can forecast needs of the system and subsystems, such as need for addition or removal of components at a specific date.

Another challenge faced by engineers working with a system is understanding how the system acts with certain inputs and conditions. For example, an engineer may want to determine whether a first component would be overloaded if a second component was supplied with a specific input. In another example, the engineer may want to determine when a component will need to be replaced or if the component has become redundant in the system. This is especially tricky without accurate drawings of the system and can be an inefficient use of energy, leading to excessive greenhouse gas emissions by the system. The disclosed system remedies this by creating a digital twin of a system that can accurately simulate the system. The benefits and advantages of the disclosed system result in reduced carbon emissions and improved energy efficiency by directly reducing power losses and thus energy consumption through understanding how to redesign and update systems.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer (PC). Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players, and the like. Indeed, the terms "computer," "server," and the like are generally used interchangeably herein and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices that are linked through a communications network, such as a local area network (LAN), a wide area network (WAN), a wireless telecommunications network, or the Internet. In a distributed computing environment, program modules can be located in both local and remote memory storage devices.

Aspects of the invention can be stored or distributed on tangible computer-readable media, including magnetically or optically readable computer discs, hardwired or preprogrammed chips (e.g., EEPROM semiconductor chips), nanotechnology memory, biological memory, or other data storage media. In some embodiments, computer-implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (packet-switched, circuit-switched, or other scheme). The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home)

and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

System Overview

Figure 2:
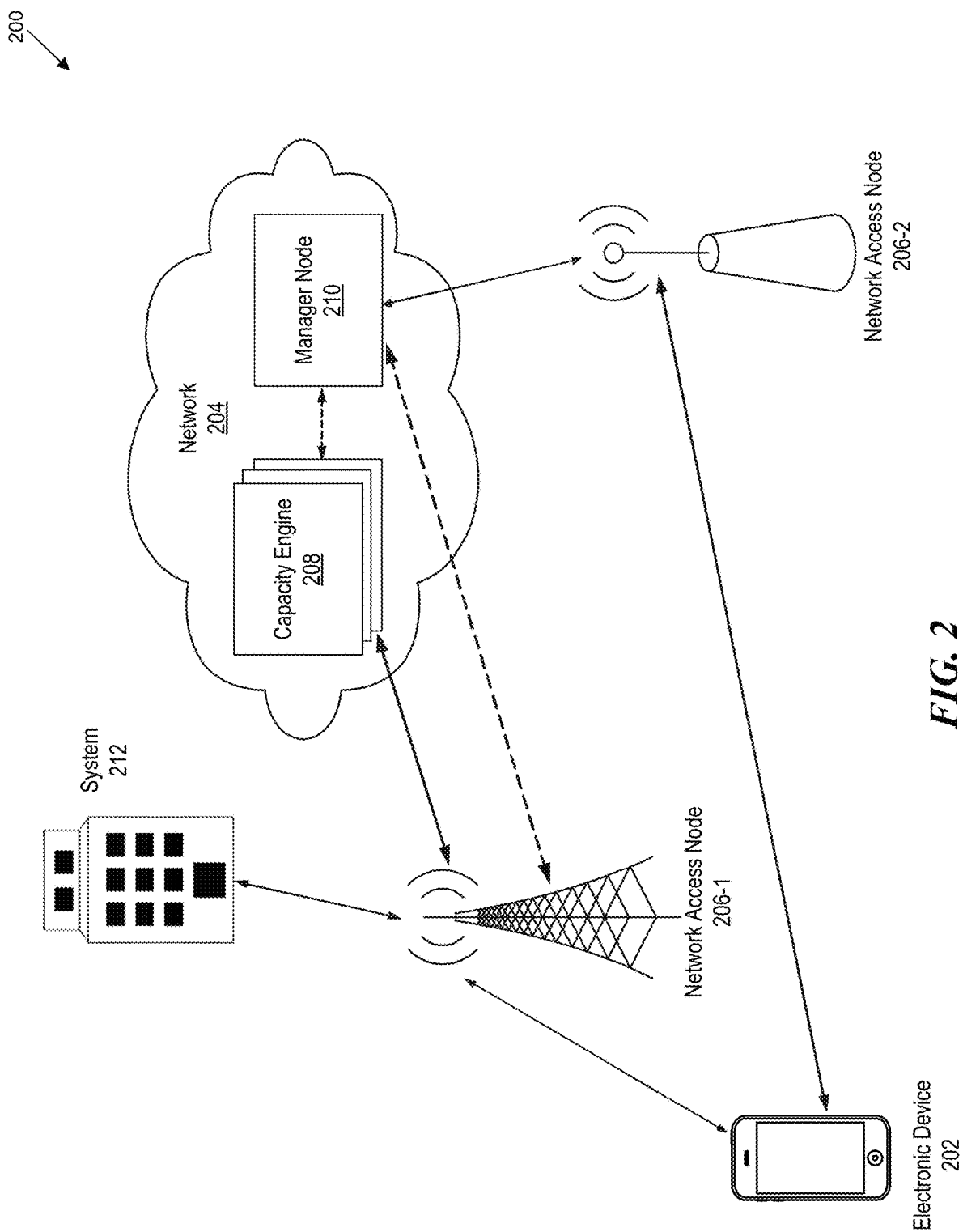
FIG. 2 is a block diagram that illustrates a system that assesses capacity of systems.

FIG. 2 is a block diagram that illustrates an environment of a capacity assessment system 208 that assesses capacity of systems 212. The environment 200 includes an electronic device 202 that is communicatively coupled to one or more networks 204 via network access nodes 206-1 and 206-2 (referred to collectively as network access nodes 206).

The electronic device 202 is any type of electronic device that can communicate wirelessly with a network node and/or with another electronic device in a cellular, computer, and/or mobile communications system. Examples of the electronic device 202 includes smartphones (e.g., Apple iPhone, Samsung Galaxy), tablet computers (e.g., Apple iPad, Samsung Note, Amazon Fire, Microsoft Surface), wireless devices capable of M2M communication, wearable electronic devices, movable IoT devices, and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more buses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

FIG. 2 depicts different types of network access nodes 206 to illustrate that the electronic device 202 can access different types of networks through different types of network access nodes. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, WLAN, Global System for Mobile Communications (GSM), GSM Enhanced Data Rates for Global Evolution (EDGE) Radio Access Network (GERAN), 4G or 5G wireless WWAN, and other systems that can also benefit from exploiting the scope of this disclosure.

The environment 200 includes a manager node 210 that can use a capacity engine 208 to project capacity of a system 212 for various time periods. In some embodiments, the manager node 210 can include any number of server computers communicatively coupled to the electronic device 202 and system 212 via the network access nodes 206. The manager node 210 can include combinations of hardware and/or software to process condition data, perform functions, communicate over the network(s) 204, etc. For example, server computers of the manager node 210 can include a processor, memory or storage, a transceiver, a display, operating system and application software, and the like. Other components, hardware, and/or software included in the environment 200 that are well known to persons skilled in the art are not shown or discussed herein for brevity. Moreover, although shown as being included in the network(s) 204, the manager node 210 can be located anywhere in the environment 200 to implement the disclosed technology.

The environment 200 includes a capacity engine 208 that uses data received from meters in a system to assess capacity of the system 212. The system can be a facility, multiple facilities, or a company including a variety of interconnected components or can be a system of components within an electrical system installed in a facility, house, or any other suitable environment. For simplicity, the following description pertains to a system within the facility, including the components and physical space of the facility. The capacity engine 208 can provide a holistic view of capacity of the facility, including space, cooling, and power capacity of the facility. The capacity engine 208 can simulate behavior of subsystems within the system 212. The capacity engine 208 can forecast expected capacity of the system 212 over time, which the capacity engine 208 can use to predict reductions in capacity that may occur in the subsystems.

The system 212 includes a variety of components that are connected together and perform an overall function within a facility. For example, the components of a system 212 may function as part of a data center or switch room that performs operations for a telecommunications network. The components can include generators, transducers, computer room air conditioning (CRAC) units, computer room air handlers (CRAHs), servers, compressors, power sources, switches, meters, and the like. The components may be grouped into subsystems within the system 212. Each subsystem can include one or more components of the system 212 that function together to complete a sub-function of the overall function. Examples of subsystems include computer rooms, power systems, cooling (chilled water, direct expansion, etc.) systems, and server farms. A subsystem can include multiple instances of the same component for redundancy. For example, a subsystem may include ten servers in a computer room, a first CRAC unit that regulates temperature in the computer room, and a second CRAC unit that acts as a counterpart to the first CRAC unit such that the second CRAC unit regulates the temperature if the first CRAC unit fails. Redundant components can also function simultaneous to their counterparts to provide support for the sub-function of their subsystem or another subsystem in the system 212.

The meters can be coupled to components and/or connections between components throughout the system 212 and can be located where inputs and outputs to the system 212 are entered and received, respectively. The manager node 210 can access a representation of the system 212 that depicts the location of the meters, types of components, locations of components, and subsystems of components in the system 212. The representation may be stored locally or the manager node 210 may create a one-line diagram representing all or part of system based on output data from the meters. This concept is further described in U.S. application Ser. No. 18/352,053 filed on Jul. 13, 2023, which is incorporated by reference herein. The meters communicate output data to the manager node 210, which in turn communicates the output data to the capacity engine 208. In some embodiments, the capacity engine 208 receives the output data directly from the meters. The manager node 210 and the capacity engine 208 may be local to the system 212 (e.g., in the same building) and/or may receive output data from the meters of the system 212 via the network 204.

The manager node 210 receives output data from each meter in the system 212. The output data can describe output data within the system 212 captured over a time period. A first subset of the output data may be expressed in standard resource units, such as joules, volt-amps, amps, volts, ohms, farads, and watts and may be captured from outputs of components in an electrical system of the system 212. In some instances, the output data in the first subset can represent direct current (DC) power and/or alternating current (AC) power. A second subset of the output data can be expressed in non-standard resource units. For example, output data in the second subset may be expressed in meters, temperature, etc. Other output data may come from a cooling system within the system 212. The manager node 210 can store the output data in a system datastore in association with an identifier of a respective meter the output data came from and an identifier of the subsystem containing the meter. The system datastore may be local to the manager node 210 or may be located at a server connected to the manager node 210 via the network 204.

The manager node 210 sends the output data to the capacity engine 208. The manager node 210 may do so in response to receiving a request for capacity assessment of the system 212. The manager node 210 can receive the request from a graphical user interface (GUI) presented at an electronic device 202 in the network 204. The manager node 210 can additionally or alternatively send the output data to the capacity engine 208 in response to detecting a change in a subset of the output data (e.g., change in magnitude of output data, lack of output data received, etc.) from one of the meters or components. The request can include the time period of output data desired and can be specified by an operator via the GUI. In some embodiments, the manager node 210 sends all output data captured since the manager node 210 last sent output data to the capacity engine 208 in response to the request.

The capacity engine 208 receives output data from the manager node 210 and may store the output data in a local datastore in relation to the identifier of the associated meter and the identifier of the associated subsystem of the output data. The capacity engine 208 may access this output data later, such that the manager node 210 only needs to send new output data to the capacity engine 208 in response to capacity requests.

For each subsystem in the system 212, the capacity engine 208 determines a set of conversion factors for the subsystem. Each conversion factor describes the design and operation of an associated component within the system 212 and can be used to convert output data into standard resource units. A conversion factor can be determined based on a variety of subfactors that, when combined, result in the conversion factor. For example, the subfactors can include one or more of: a recovery load subfactor (specified by an operator), a power factor (representing how efficiently the component operates), a load subfactor (e.g., a maximum load ratio), a power usage effectiveness subfactor (e.g., power of the component compared to power of the system), a redundancy subfactor (e.g., if the component has one or more counterparts in its subsystem or the system 212), a nominal capacity subfactor (e.g., the intended full-load sustained output of the system 212), a safety subfactor (e.g., limits on the component that ensure the component can work within the system 212 based on the other components' loads and its own load), and a facility subfactor (e.g., to account for weather near the facility, altitude of the facility, etc.). The conversion factor may also be based on one or more subfactors of standards, where each subfactor represents a standard electrical convention that would be used in converting the output data to standard power units, such as Ohm's Law, Watt's Law, and the like.

The system 212 can access a conversion index that stores conversion factors for components. The conversion index may also store conversion data needed to determine the conversion factor and/or subfactors, such as input values from operator(s), a one-line diagram of the system 212, and data sheets of the components. For each component related to a subset of the output data, the system 212 can access and combine the associated subfactors together to determine the conversion factor for the output data. The system 212 can combine the subfactors using addition, multiplication, or another mathematical method. The system 212 may store the conversion factor in association with the identifier of the component and a determination time in the conversion index.

The system 212 may update the conversion factors stored in the conversion periodically, when new conversion data is received, or upon request made via the GUI. In some instances, a subset of the output data may not be directly convertible into standard resource units. For example, the subset can include temperature data, memory availability, processing ability, other components supported by the component of the subset, and the like. In these cases, the conversion factor associated with the component of the subset can be applied to the subset to convert the subset to a representation of the subset in terms of resource units. This allows the capacity engine 208 to incorporate output data that would have otherwise been ignored into the estimate of the capacity of the entire system 212 (e.g., including electrical systems and cooling systems). The system 212 applies the conversion factors to their associated subsets of output data and combines the converted output data to determine a capacity of the system 212. In some instances, the system 212 determines capacity of each individual subset, such as by determining carrying capacity (e.g., IT load) of an electrical system within the system 212.

The capacity engine 208 can also determine space capacity of the facility of the system 212. For instance, the capacity engine 208 can access the amount of physical space each component of the system 212 occupies (e.g., space data), which can be stored locally at the capacity engine 208 or at the system database of the manager node 210. The space data can include area, volume, and other physical measurements of the component. The space data may also be associated with a location within the system 212, which can be represented three-dimensionally (3D). For example, a server may be located on the third highest rack in a cabinet on the bottom floor of the facility. The capacity engine 208 can also access facility information, such as where outlets are located, what physical space cannot be accessed for certain components, and what space capacity limitations apply based on governmental or company rules and regulations. Based on the space data of each component and the facility information, the capacity engine 208 can determine how much physical space is available for use (e.g., space capacity) within the facility. For example, the capacity engine 208 may construct a 3D version of the facility and the components to determine what physical space is available for use.

The capacity engine 208 can assess the capacity of the system 212 over time and store the capacity in relation to the time of assessment locally or in the system datastore. The capacity engine 208 can assess trends of output data from the system 212 based on the stored capacities over time. For example, the capacity engine 208 may determine that the capacity of a generator is reducing at an exponential level over time. The capacity engine 208 may perform one or more trend analysis techniques on the capacities to determine trends.

The capacity engine 208 can simulate behavior (e.g., capacity of components, the system 212, electrical behavior of an electrical subsystem, etc.) of the system 212 based on the determined trends for each component. The capacity engine 208 may receive, via a GUI presented at an electronic device 202 connected via the network 204, input data from an external operator indicating a desired capacity for one or more components, a desired capacity of the entire system 212, desired output data from one or more components, and a desired time period over which to analyze behavior. The capacity engine 208 can also receive, via the GUI, indications of possible changes in physical location of or connections between components, addition of components, and removal of components. The capacity engine 208 can simulate behavior of the system 212 based on the possible changes by creating an updated 3D representation of the system 212, using other conversion factors, and/or removing output data that contributes to the capacity of the entire system 212. The capacity engine 208 can also determine space capacity of the facility based on the input data and possible changes by accessing space data for new and/or existing components.

The capacity engine 208 can output results of the simulation for presentation via the GUI. For instance, the capacity engine 208 can output graphs representing capacity of the system 212 and each component over the time period. The capacity engine 208 can also output alerts to the GUI indicating when component(s) run out of capacity, when counterpart(s) begin operating in place of component(s), or when component(s) lose enough capacity to cause the capacity of the system 212 to fall below a threshold level. The alerts can also include information indicating what new component(s) are needed to replace failing component(s), when new component(s) would need to be installed in the facility or repaired by, what component(s) are not operating efficiently, and/or what settings of the components or related components need to be changed to avoid affecting the capacity of the system 212.

In some instances, the alerts can recommend a new version of the components to use as replacements based on data describing components available for purchase. For example, the capacity engine 208 may determine during a simulation that the system 212 will need more servers for its storage needs in five years. The capacity engine 208 may send an alert indicating this via the GUI, such that an external operator can plan to obtain and install those servers, build a new facility that includes more servers, or obtain connections to virtual servers within five years. The capacity engine 208 can also output an expected cost of replacement or repair of the components via the GUI. Examples of such GUIs are further described in relation to FIGS. 4A-C.

Figure 3:
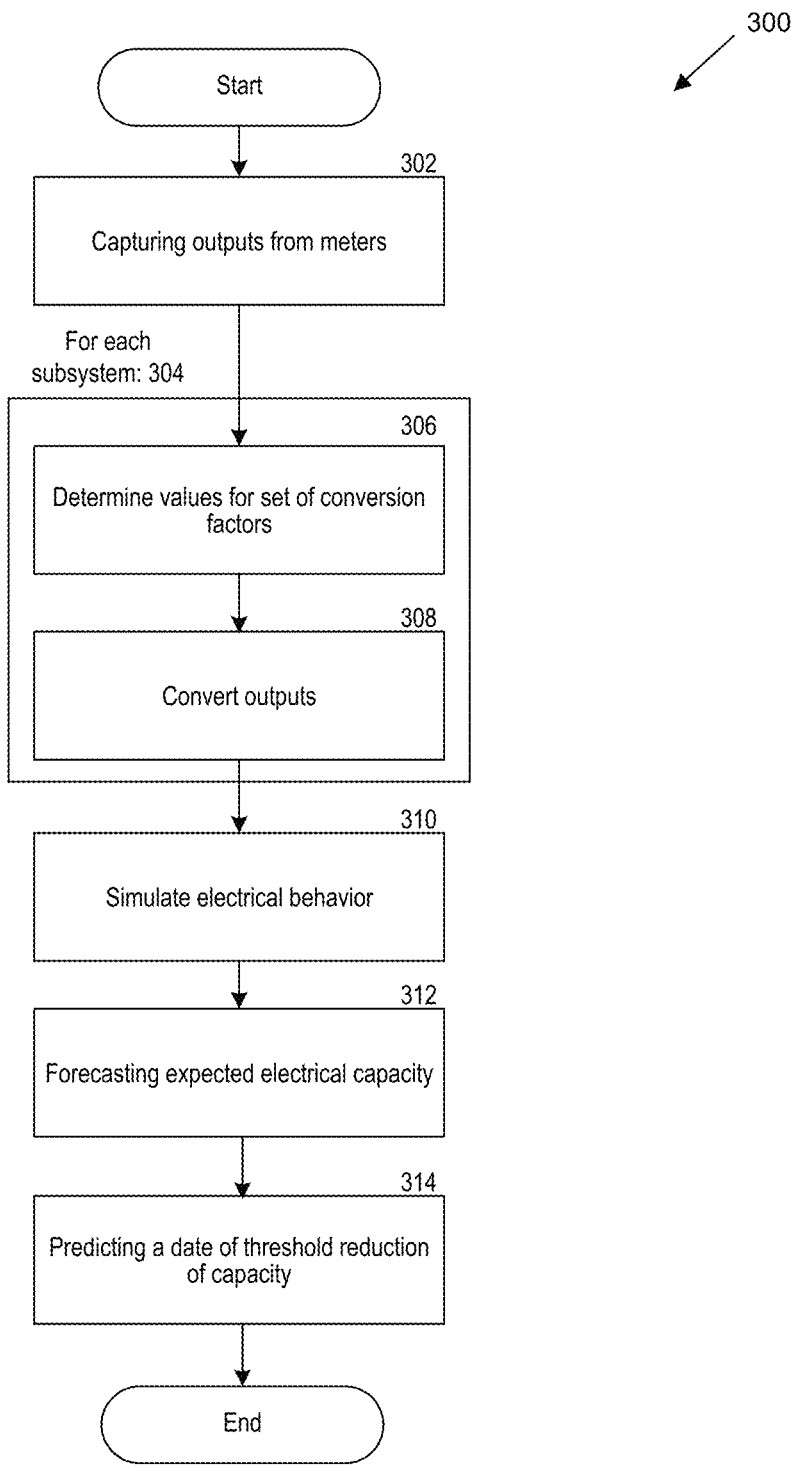
FIG. 3 is a flowchart that illustrates a process for simulating capacity of a system.

FIG. 3 is a flowchart that illustrates a process for forecasting capacity (e.g., capacity) of a system, such as a telecommunications system. The capacity engine 208 can employ the process 300 to forecast capacity based on converting outputs from subsystems in the system. In some embodiments, the capacity engine 208 can perform additional or alternative steps to those shown in FIG. 3 or can perform the process for another system.

The capacity engine 208 captures 302 outputs of meters coupled to a set of subsystems in the system. In some embodiments, the capacity engine 208 directly retrieves the outputs from the meters. In other embodiments, the capacity engine 208 receives the outputs via the manager node 210. The outputs are captured over the same period of time and at least a subset of the outputs are expressed in non-standard resource units. Further, the set of subsystems includes at least one power system and at least one cooling system.

For each subsystem of the set of subsystems 304, the capacity engine 208 determines 306 values for a set of conversion factors related to the subsystem (e.g., for each component in the subsystem). The set of conversion factors describe design and operation of the subsystem and a standard electrical convention of the output from a meter coupled to the subsystem. For example, the output related to the CRAH may be expressed in degrees Celsius, which the capacity engine 208 converts to a representation of the output in terms of resource units. In another example, the subsystem includes a CRAH, a server, and a generator, and the capacity engine 208 accesses conversion factors for each of these components in the conversion index and determines values for the conversion factors based on specification (e.g., datasheet) data, operator inputs, and outputs of other components. The capacity engine 208 converts the outputs based on the conversion factors. For a subset of the outputs not expressed in standard power units, the capacity engine 208 converts 308 the outputs from the non-standard resource units to a standard power unit (e.g., watts) based on the values of the set of conversion factors.

The capacity engine 208 determines trends associated with the converted outputs. For instance, the capacity engine 208 may apply trend analysis to the outputs for each component to determine a trend for the component. The capacity engine 208 simulates 310 behavior of the set of subsystems in the system based on trends indicated in the converted outputs. The trends may further include dependencies between the components in the subsystem with each other and/or with other subsystems. For example, the capacity engine 208 may determine that the output from a cooling unit is steady when a generator is turned on. The capacity engine 208 may receive inputs via interactive elements of a GUI that indicate conditions and parameters of the system for simulation and simulate the system's behavior accordingly. In one example, the conditions can include altitude and temperature and the parameters can include generators of the subsystem only operating at night.

The capacity engine 208 can receive a request to forecast capacity of the system over a specified time period via an interactive element at the GUI. The capacity engine 208 can forecast 312 the expected capacity of the system over the time period based on the simulation of the behavior of the set of subsystems. The capacity engine 208 may use conditions and parameters specified in the request for the forecasting and/or can simulate the system based on adjustments entered via the GUI. The capacity engine 208 can transmit the forecasting results for presentation via the GUI. The adjustments can include adding and/or removing components and/or cabinets to or from the system. The forecasting results may be in the form of raw data or a graphical representation of the raw data showing the capacity of the system, its subsystems, and/or its components over the time period.

The capacity engine 208 can predict 314, based on the forecast, a date within the time period when a particular subsystem will experience a threshold reduction in capacity. For example, the capacity engine 208 may determine that a generator will stop working in two years and three days, resulting in the carrying capacity of the generator's subsystem being reduced at that date. The capacity engine 208 may send an alert for presentation at the GUI indicating the date, an identifier of the generator, and an identifier of the generator's subsystem. The capacity engine 208 may further determine one or more components to be added to the subsystem before the date to prevent the subsystem from experiencing the threshold reduction of capacity. The capacity engine 208 can reforecast the capacity upon receipt of new outputs, new requests, or after an amount of time.

The capacity engine 208 can receive space data describing an amount of physical space associated with the facility of the system and a quantity of racks and components currently in the system. The capacity engine 208 can determine a space capacity of the facility based on the space data. For instance, the capacity engine 208 can divide a measure of the physical space of the facility into a measure of a set of cabinets (e.g., the facility contains 200 cabinets). The measure of each cabinet may be in a standardized unit of physical space (e.g., two by two-by-two feet in volume each). The capacity engine 208 predicts an excess physical space (e.g., space capacity) of cabinets available for use during the time period based on the expected capacity. For example, if the capacity engine 208 determines that components need to be added, removed, repaired, or replaced to prevent a threshold reduction in capacity of a subsystem, the capacity engine 208 can determine what physical space is left over after these changes are made. The capacity engine 208 may determine that the excess physical space is smaller than a minimum physical space required to house a set of components for the subsystem in the set of cabinets. The capacity engine 208 may, in response, send an alert via the GUI indicating the date and an number of cabinets required to prevent the subsystem from experiencing the threshold reduction of capacity.

In some embodiments, the capacity engine 208 detects a counterpart (e.g., a redundant component) in the subsystem. The counterpart may be functionally the same as a primary component in the subsystem. Responsive to determining that the primary component would cause the subsystem to experience the threshold reduction of capacity during the time period, the capacity engine 208 can forecast a new capacity of the system over the time period based on the primary component being replaced by the counterpart on or before the date. In some embodiments, the capacity engine 208 prevents power from being output to one or more components in the subsystem to reduce energy usage of the system, thereby reducing greenhouse gas emissions that would have otherwise been output by the system.

FIGS. 4A-C are examples of GUIs depicting data based on analysis of outputs by the capacity engine 208. FIG. 4A depicts a GUI 400A including a graph 401 of capacity gaps across a plurality of components 406 in a system over a time period of one year. The GUI 400A includes a chart 402 that depicts a percentage of utilization of the components in the system and interactive elements 404 that an operator can interact with to change the time period of data shown, which component's data is shown, and the like. FIG. 4B depicts a GUI 400B with a graph 408 of capacity gaps for a time period of five years and for fewer components 410 than the components of the graph 406 in FIG. 4A. FIG. 4C depicts a GUI 400C including interactive elements representing components, where the interactive elements can be added to or removed from different locations within the system.

Computer System

Figure 5:
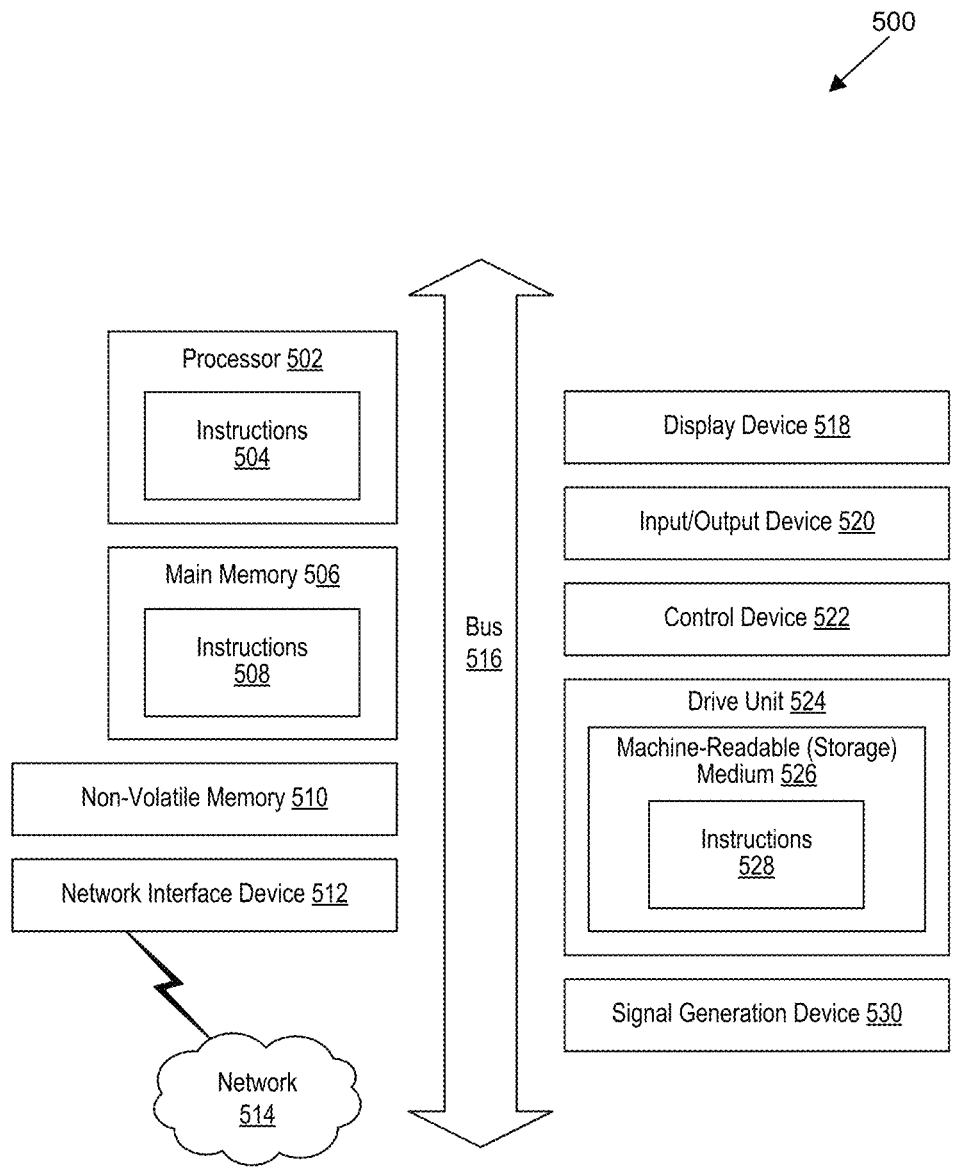
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, PC, tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system such as a mesh of computer systems, or can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon that, when executed by at least one processor of a system of a wireless telecommunications network, cause the system to:
   capture outputs of meters coupled to a set of subsystems in a facility,
      wherein the outputs are captured over a period of time and a subset of the outputs are expressed in non-standard resource units, and
      wherein the set of subsystems includes at least one power system and at least one cooling system;
   for each subsystem of the set of subsystems:
      determine values for a set of conversion factors related to the subsystem based on a conversion index for the subsystem, wherein the conversion index is based on inputs from operators of the subsystem, a one-line diagram of the subsystem, and datasheets for components of the subsystem, and wherein the set of conversion factors describe design and operation of the subsystem; and convert outputs of the subset of outputs from the non-standard resource units to a standard resource unit based on the values of the set of conversion factors for the subsystem;

simulate behavior of the set of subsystems in the facility based on trends indicated in the converted outputs;

forecast an expected capacity of the facility over a time period based on the simulation of the behavior of the set of subsystems; and predict, based on the forecast, a date within the time period when a particular subsystem of the set of subsystems will experience a threshold reduction in capacity of the facility.

2. The system of claim 1, wherein the instructions further cause the system to:

prevent additional greenhouse gas emission in the form of reducing energy output to one or more components of the particular subsystem.

3. The non-transitory, computer-readable storage medium of claim 1, wherein the instructions further cause the system to:

determine, based on the prediction that the particular subsystem will experience the threshold reduction in capacity during the time period, a set of components to be added to the particular subsystem during the time period to prevent the particular subsystem from experiencing the threshold reduction in capacity.

4. The non-transitory, computer-readable storage medium of claim 3, wherein the instructions further cause the system to:

receive space data describing an amount of physical space associated with the facility and a quantity of racks and equipment currently in the facility;

divide a measure of the physical space into a measure of a set of cabinets, wherein a measure of each cabinet is in a standardized unit of physical space;

predict an excess physical space of cabinets available for use during the time period based on the expected capacity;

determine that the excess physical space is greater than a minimum physical space required to house a set of components in the set of cabinets; and responsive to predicting that the excess physical space is smaller than the minimum physical space required to house the set of components in the set of cabinets, send an alert via a graphical user interface, wherein the alert indicates the date and an amount of cabinets required to prevent the particular subsystem from experiencing the threshold reduction in capacity.

5. The non-transitory, computer-readable storage medium of claim 4, wherein the instructions further cause the system to:

simulate, based on inputs via interactive elements of the graphical user interface, adjustments to the facility before the time period, wherein the adjustments include one or more of:

addition of one or more components; and
addition of cabinets; and forecast a new capacity of the facility over the time period based on the adjustments.

6. The non-transitory, computer-readable storage medium of claim 1, wherein the instructions further cause the system to:

detect a redundant component in the particular subsystem, wherein the redundant component is functionally the same as a primary component in the particular subsystem; and responsive to determining that the primary component would cause the particular subsystem to experience the threshold reduction in capacity during the time period, forecast a new capacity of the facility over the time period, wherein the new capacity is based on the primary component being replaced by the redundant component on or before the date.

7. The non-transitory, computer-readable storage medium of claim 1, wherein the instructions further cause the system to:

output, via a graphical user interface, the forecasted capacity over the time period in a graph, the forecasted capacity graphed based on the subsystem.

8. The non-transitory, computer-readable storage medium of claim 1, wherein the set of conversion factors include a recovery load factor, power efficiency factor, maximum load ratio factor, power usage efficiency factor, capacity ratio factor, redundancy factor, safety factor, or facility factor.

9. The non-transitory, computer-readable storage medium of claim 1, wherein the facility includes a data center or switch room.

10. A method for predicting a capacity of a telecommunications system, the method comprising:

capturing outputs of meters coupled to a set of subsystems in the telecommunications system, wherein the outputs are captured over a period of time and expressed in non-standard resource units, and wherein the set of subsystems includes at least one power system and at least one cooling system;

for each subsystem of the set of subsystems:

determining values for a set of conversion factors related to the subsystem based on a conversion index for the subsystem, wherein the conversion index is based on inputs from operators of the subsystem, a one-line diagram of the subsystem, and datasheets for components of the subsystem, and wherein the set of conversion factors describe design and operation of the subsystem; and converting the outputs from the non-standard resource units to a standard resource unit based on the values of the set of conversion factors for the subsystem;

simulating behavior of the set of subsystems in the telecommunications system based on trends indicated in the converted outputs;

forecasting an expected capacity of the telecommunications system over a time period based on the simulation of the behavior of the set of subsystems; and predicting, based on the forecast, a date within the time period when a particular subsystem of the set of subsystems will experience a threshold reduction in capacity.

11. The method of claim 10, further comprising:

determining, based on the prediction that the particular subsystem will experience the threshold reduction in capacity during the time period, a set of components to be added to the particular subsystem during the time period to prevent the particular subsystem from experiencing the threshold reduction in capacity.

12. The method of claim 11, further comprising:
receiving space data describing an amount of physical space associated with the telecommunications system and a quantity of racks and equipment currently in the telecommunications system;
dividing a measure of the physical space into a measure of a set of cabinets,
wherein a measure of each cabinet is in a standardized unit of physical space;
predicting an excess physical space of cabinets available for use during the time period based on the expected capacity;
determining that the excess physical space is greater than a minimum physical space required to house a set of components in the set of cabinets; and
responsive to predicting that the excess physical space is smaller than the minimum physical space required to house the set of components in the set of cabinets,
sending an alert via a graphical user interface,
wherein the alert indicates the date and an amount of cabinets required to prevent the particular subsystem from experiencing the threshold reduction in capacity.

13. The method of claim 12, further comprising:
simulating, based on inputs via interactive elements of the graphical user interface, adjustments to the telecommunications system before the time period, wherein the adjustments include one or more of:
addition of one or more components; and
addition of cabinets; and
forecasting a new capacity of the telecommunications system over the time period based on the adjustments.

14. The method of claim 10, further comprising:
detecting a redundant component in the particular subsystem,
wherein the redundant component is functionally the same as a primary component in the particular subsystem; and
responsive to determining that the primary component would cause the particular subsystem to experience the threshold reduction in capacity during the time period, forecasting a new capacity of the telecommunications system over the time period,
wherein the new capacity is based on the primary component being replaced by the redundant component on or before the date.

15. The method of claim 10, further comprising:
outputting, via a graphical user interface, the forecasted capacity over the time period in a graph, the forecasted capacity graphed based on the subsystem.

16. The method of claim 10, wherein the set of conversion factors include a recovery load factor, power efficiency factor, maximum load ratio factor, power usage efficiency factor, capacity ratio factor, redundancy factor, safety factor, or facility factor.

17. The method of claim 10, wherein the telecommunications system includes a data center or switch room.

18. The method of claim 10, wherein the at least one cooling system is a chilled water system and/or a direct expansion cooling system.

19. A system comprising:
at least one hardware processor; and
at least one non-transitory memory storing instructions that, when executed by the at least one hardware processor, cause the system to:
capture outputs of meters coupled to a set of subsystems in the system,
wherein the outputs are captured over a period of time and expressed in non-standard resource units, and
wherein the set of subsystems includes at least one power system and at least one cooling system;
for each subsystem of the set of subsystems:
determine values for a set of conversion factors related to the subsystem based on a conversion index for the subsystem,
wherein the conversion index is based on inputs from operators of the subsystem, a one-line diagram of the subsystem, and datasheets for components of the subsystem, and
wherein the set of conversion factors describe design and operation of the subsystem; and
convert the outputs from the non-standard resource units to a standard resource unit based on the values of the set of conversion factors for the subsystem;
simulate behavior of the set of subsystems in the system based on trends indicated in the converted outputs;
forecast an expected capacity of the system over a time period based on the simulation of the behavior of the set of subsystems; and
predict, based on the forecast, a date within the time period when a particular subsystem of the set of subsystems will experience a threshold reduction in capacity of the system.

20. The system of claim 19, wherein the instructions further cause the system to:
output, via a graphical user interface, the forecasted capacity over the time period in a graph, the forecasted capacity graphed based on the subsystem.

* * * * *